(12) United States Patent
Park

(10) Patent No.: US 10,662,997 B2
(45) Date of Patent: May 26, 2020

(54) ROLLER ASSEMBLY FOR STORAGE DEVICE

(71) Applicant: CHEONGHOSYSTEM CO., LTD., Jinju-si, Gyeongsangnam-do (KR)

(72) Inventor: Yongwoon Park, Jinju-si (KR)

(73) Assignee: CHEONGHOSYSTEM CO., LTD, Jinju-si, Gyeongsangnam-Do (KR)

(*) Notice: Subject to any disclaimer, the term of this patent is extended or adjusted under 35 U.S.C. 154(b) by 0 days.

(21) Appl. No.: 16/348,555

(22) PCT Filed: Jul. 19, 2018

(86) PCT No.: PCT/KR2018/008179
§ 371 (c)(1),
(2) Date: May 9, 2019

(87) PCT Pub. No.: WO2019/035569
PCT Pub. Date: Feb. 21, 2019

(65) Prior Publication Data
US 2019/0293113 A1    Sep. 26, 2019

(30) Foreign Application Priority Data

Aug. 14, 2017  (KR) .................. 10-2017-0103173
Jan. 16, 2018  (KR) .................. 10-2018-0005666

(51) Int. Cl.
*F16C 13/02*    (2006.01)
*F16C 19/06*    (2006.01)
(Continued)

(52) U.S. Cl.
CPC ............ *F16C 13/02* (2013.01); *F16C 13/006* (2013.01); *F16C 19/06* (2013.01); *F16C 35/063* (2013.01)

(58) Field of Classification Search
CPC .......... F16C 13/02; F16C 19/06; F16C 33/60; F16C 33/547; F16C 33/583; F16C 35/04; F16C 35/063; F16C 33/62
(Continued)

(56) References Cited

U.S. PATENT DOCUMENTS 1,615,810 A * 1/1927 Du Mazuel ............. F16C 33/60
                                                    384/505
2,995,405 A * 8/1961 Ferdig ..................... F16C 33/62
                                                    384/547

(Continued)

FOREIGN PATENT DOCUMENTS

JP    3350259 B2    9/2002
JP    2003-120691 A    4/2003
(Continued)

*Primary Examiner* — Marcus Charles
(74) *Attorney, Agent, or Firm* — Novick, Kim & Lee, PLLC; Jae Youn Kim

(57) ABSTRACT

Provided is a roller assembly for a storage device. The roller assembly includes a shaft member, a rolling member, a cover member, and ball members. In particular, the ball members are configured to perform a rolling operation while being maintained in the state of being seated at specific locations by a seating groove formed in the shaft member and guide grooves formed in the rolling member and the cover member, and the rolling member and the cover member are configured to be coupled to each other by a fitting method and are then completely coupled to each other through laser bonding. The roller assembly is additionally characterized in that the damage of the ball members is prevented from occurring during the above laser bonding.

7 Claims, 17 Drawing Sheets

(51) Int. Cl.
*F16C 13/00* (2006.01)
*F16C 35/063* (2006.01)

(58) Field of Classification Search
USPC ....... 384/449, 505, 539, 543, 547, 561–562, 384/585–586, 903
See application file for complete search history.

(56) References Cited

U.S. PATENT DOCUMENTS

| | | | | |
|---|---|---|---|---|
| 3,097,898 A | * | 7/1963 | Ferdig | F16C 33/62 384/547 |
| 3,501,208 A | * | 3/1970 | Kessler | F16C 33/62 384/547 |
| 4,958,943 A | * | 9/1990 | Nakanishi | F16C 13/006 384/478 |

FOREIGN PATENT DOCUMENTS

| | | |
|---|---|---|
| JP | 2010-194908 A | 9/2010 |
| KR | 20-0122346 Y1 | 8/1998 |
| KR | 10-0159907 B1 | 3/1999 |
| KR | 20-0192095 Y1 | 8/2000 |
| KR | 20-0224404 Y1 | 5/2001 |
| KR | 10-0402487 B1 | 10/2003 |
| KR | 10-2008-0021284 A | 3/2008 |
| KR | 10-2009-0004790 A | 1/2009 |
| KR | 10-0908659 B1 | 7/2009 |
| KR | 20-2010-0000325 U | 1/2010 |
| KR | 20-0452543 Y1 | 3/2011 |
| KR | 10-2014-0088395 A | 7/2014 |
| KR | 10-1437957 B1 | 9/2014 |
| KR | 10-2016-0026646 A | 3/2016 |

\* cited by examiner

ROLLER ASSEMBLY FOR STORAGE DEVICE

TECHNICAL FIELD

The present invention relates generally to a roller assembly that is applied to a storage device, and more specifically to a novel type of bearing application roller assembly for a storage device, which can be easily assembled while smoothly performing a rolling operation and which can be stably maintained in an assembled state even when the storage device is operated.

BACKGROUND ART

Generally, a storage device, such as a vegetable box of a refrigerator, is equipped with a roller assembly for smooth movement during storage.

A conventional roller assembly includes a shaft configured to be coupled to the main body of a refrigerator and a roller configured to be rotatably installed at the outer end of the shaft. In connection with this, such conventional roller assemblies have been disclosed in Korean Utility Model Registration No. 20-0452543, Korean Patent No. 10-1437957, Korean Patent No. 10-0908659, and Korean Patent No. 10-0822749.

However, in the above-described conventional roller assemblies, the load applied to the shaft from the roller increases as the amount of stock stored in a storage device to which the roller is applied increases, and the load is concentrated only in a specific region between the roller and the shaft. Accordingly, problems arise in that a rolling operation is not smoothly performed and noise is generated.

Of course, conventionally, a rolling bearing having an inner ring and an outer ring is disposed between the contact surfaces of a roller and a shaft in order to prevent the above-described problems. In connection with this, related technologies have been disclosed in Korean Utility Model Registration Application Publication No. 20-2010-0000325, Korean Patent Application Publication No. 10-2014-0088395, Korean Patent No. 10-0159907, and Korean Patent No. 10-0402487.

However, the roller assemblies in which the rolling bearing is additionally disposed as described above have a problem in that, in light of the fact that the rolling bearing has been assembled using a method of press-fitting it between the roller and the shaft, it is extremely difficult to perform the operation of press-fitting the rolling bearing unless the outer diameter of the outer ring forming a part of the rolling bearing is formed into a precise size or unless the inner circumferential surface of the roller or the outer circumferential surface of the shaft is formed into a precise size.

Furthermore, when the above-described press-fitting of the rolling bearing is not accurately performed, a problem arises in that the smooth rolling of the roller is not performed or the like.

Moreover, the above-described conventional roller assemblies including a rolling bearing have a problem in that the rolling bearing is moved from an accurate location and then separated when an external impact, an excessive load, or the like is continuously applied or when the roller is operated in an inaccurate position, such as the position in which the roller rolls in the state of being inclined toward one side.

DISCLOSURE

Technical Problem

The present invention has been conceived to overcome the various problems of the conventional technologies, and an object of the present invention is to provide a novel type of roller assembly for a storage device, which can be easily assembled while smoothly performing a rolling operation and which can be stably maintained in an assembled state even when the storage device is operated.

Technical Solution

In order to accomplish the above object, the present invention provides a roller assembly for a storage device, the roller assembly including: a shaft member including a head portion configured such that the head portion forms a head part and a seating groove is depressed into a circumferential surface thereof and a coupling portion configured to extend backward from the head portion and to be engaged with a counterpart object; a rolling member configured to be formed in a cylindrical shape forming a rolling part, and configured such that a front side portion of an inner circumferential surface thereof is formed to surround a part of a front side of the head portion constituting a part of the shaft member and a coupling groove is depressed into a rear side portion of the inner circumferential surface in a stepped form; a cover member configured to be seated onto the coupling groove of the rolling member, and configured such that an inner circumferential surface thereof is formed to surround a part of a rear side of the head portion constituting a part of the shaft member; and ball members configured such that circumferential surfaces thereof are partially seated on opposite surfaces of the shaft member and the rolling and cover members and the ball members perform a rolling operation; wherein guide grooves having a same curvature as the ball members are formed at a rear side end of the inner circumferential surface of the rolling member and a front side end of the inner circumferential surface of the cover member, respectively.

In this case, a coupling limiting bather may be extended and formed between the head portion and coupling portion of the shaft member.

Furthermore, the rolling member may be formed in a color that transmits a laser beam, the cover member may be formed in a color that does not transmit a laser beam, and the opposite surfaces of the rolling member and the cover member may be fastened to each other by laser bonding.

Furthermore, a press-fitting groove may be depressed into the front of the circumferential side inside the coupling groove formed in the rolling member, a press-fitting protrusion configured to be accommodated inside the press-fitting groove may protrude from the front of the circumferential side of the cover member, and the press-fitting protrusion of the cover member may protrude up to a length sufficient to cover the portions where the ball members are located.

Furthermore, a stop step may be depressed into the inner circumferential surface of the rear side inside the coupling groove formed in the rolling member, and a stop protrusion configured to be caught in the stop step may protrude from the outer circumferential surface of the rear side of the cover member.

Furthermore, a blocking protrusion configured to prevent the cover member from being separated backward by blocking the circumferential side portion of the rear surface of the cover member seated onto the coupling groove may be formed on the rear surface of the rolling member.

Moreover, the guide grooves formed at the rear side end of the inner circumferential surface of the rolling member and the front side end of the inner circumferential surface of the cover member, respectively, may be formed to cooperatively have a depth sufficient to accommodate half or more of the diameter of the ball members.

Advantageous Effects

As described above, the roller assembly for a storage device according to the present invention has an effect in that the smooth rolling of the rolling member may be performed through the rolling operation of the individual ball members when an operation is performed to take out or put in the storage device.

In particular, the roller assembly for a storage device according to the present invention has an effect in that the assembly of the roller assembly may be easily performed because the assembly is completed by the work of sequentially seating the individual components, rather than by the work of forcibly press-fitting a bearing.

Additionally, the roller assembly for a storage device according to the present invention has an effect in that the cover member and the rolling member are coupled to each other by using the stop step and the stop protrusion, rather than by performing simple coupling through insertion, thereby performing coupling at an accurate location, and also has an effect in that in the coupled state, the cover member and the rolling member are integrated with each other by laser bonding, thereby preventing them from being separated from each other during use.

In particular, the roller assembly for a storage device according to the present invention has an effect in that the pressing force provided to the corresponding rolling member during the rolling operation of the rolling member may be desirably dispersed to the cover member through the additional provision of a structure including the press-fitting protrusion of the cover member and the press-fitting groove of the rolling member, thereby minimizing the occurrence of damage and also preventing the ball members from being damaged by a laser beam during laser bonding.

BEST MODE

Preferred embodiments of a roller assembly for a storage device according to the present invention will be described in detail below with reference to the accompanying FIGS. 1 to 17.

Figure 1:
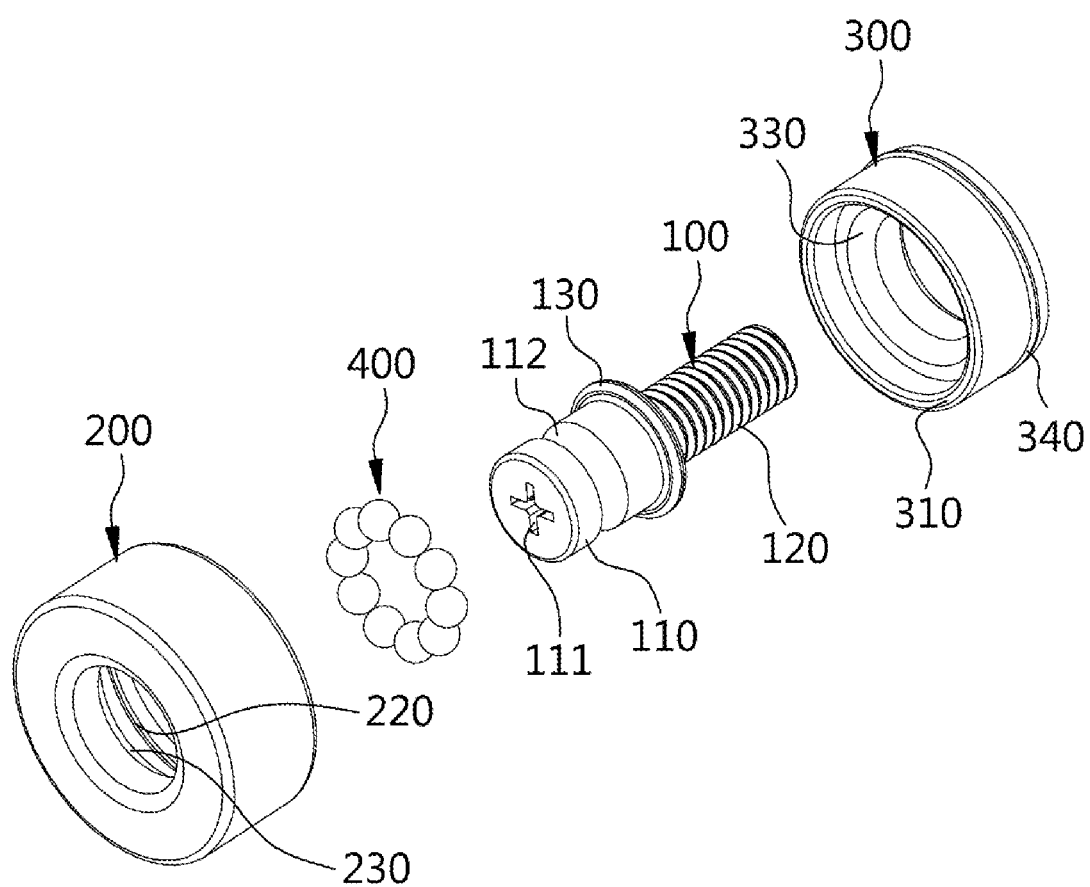
FIGS. 1 and 2 are exploded perspective views showing states viewed from different directions in order to illustrate a roller assembly for a storage device according to one embodiment of the present invention.
Figure 2:
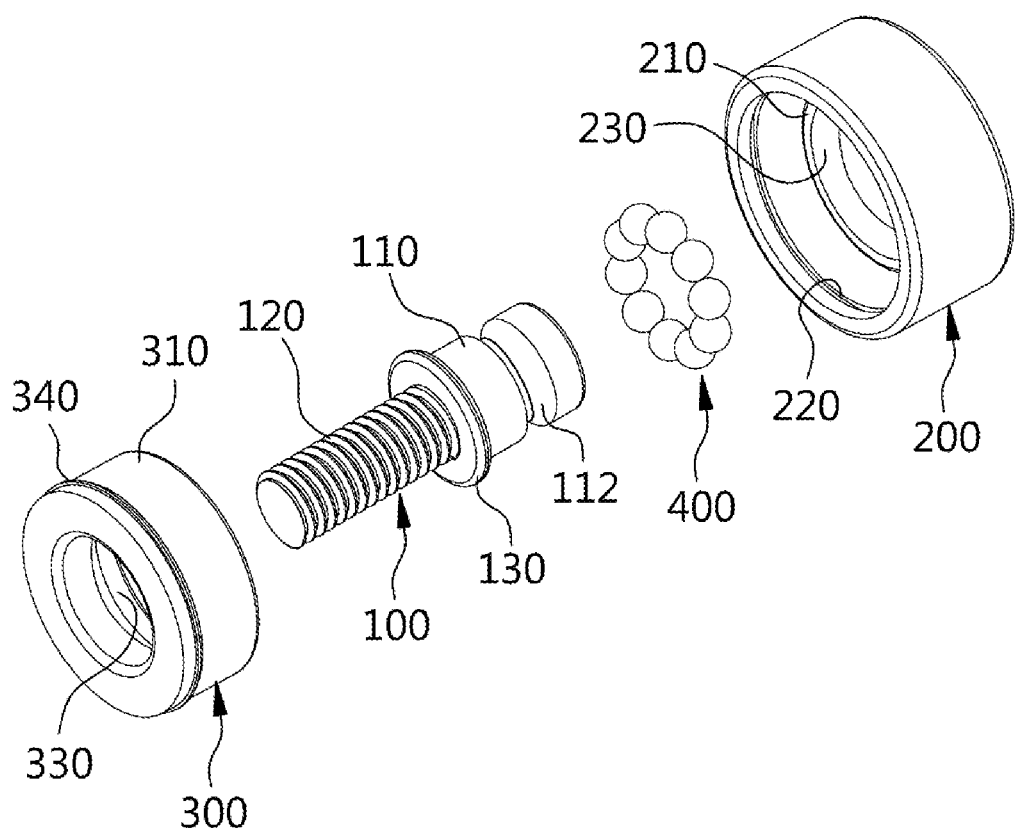
Figure 3:
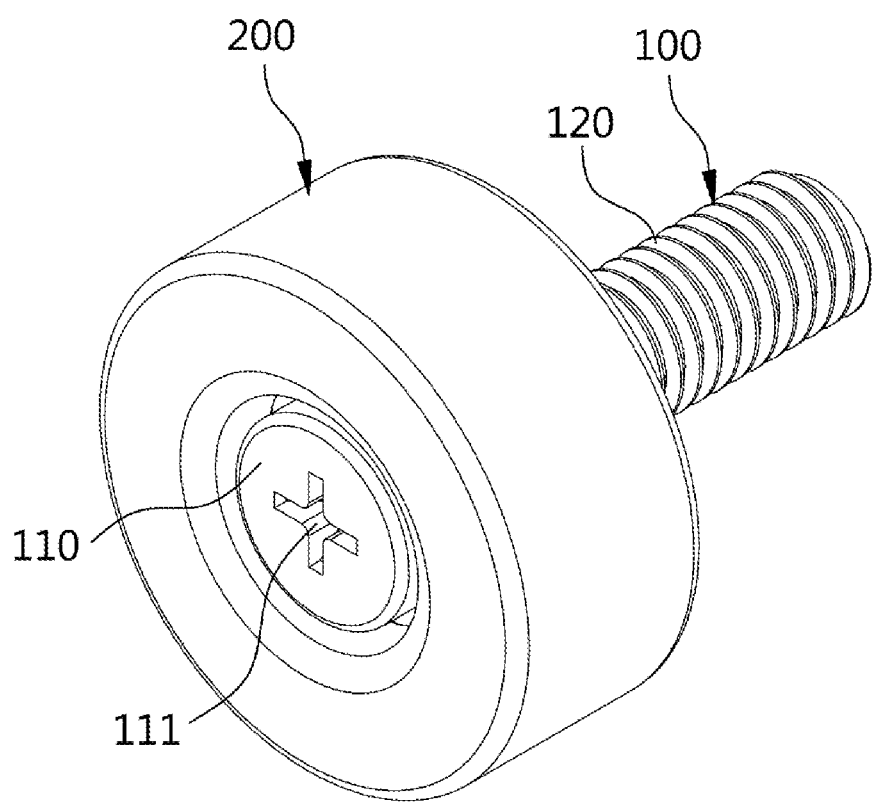
FIGS. 3 and 4 are assembled perspective views showing states viewed from different directions in order to illustrate the roller assembly for a storage device according to the one embodiment of the present invention.
Figure 4:
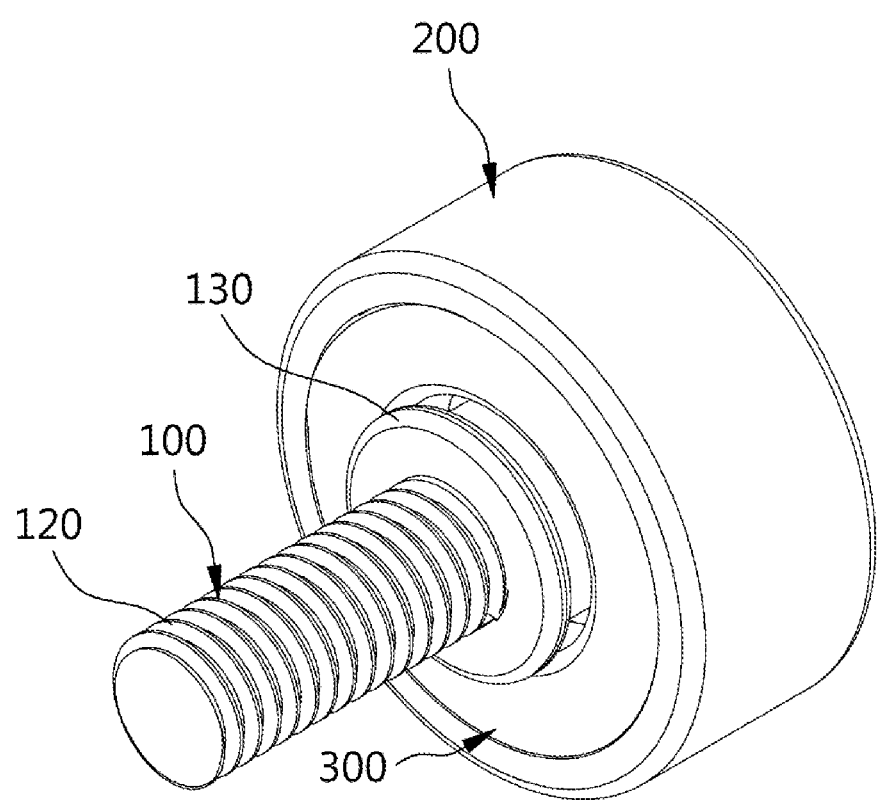
Figure 5:
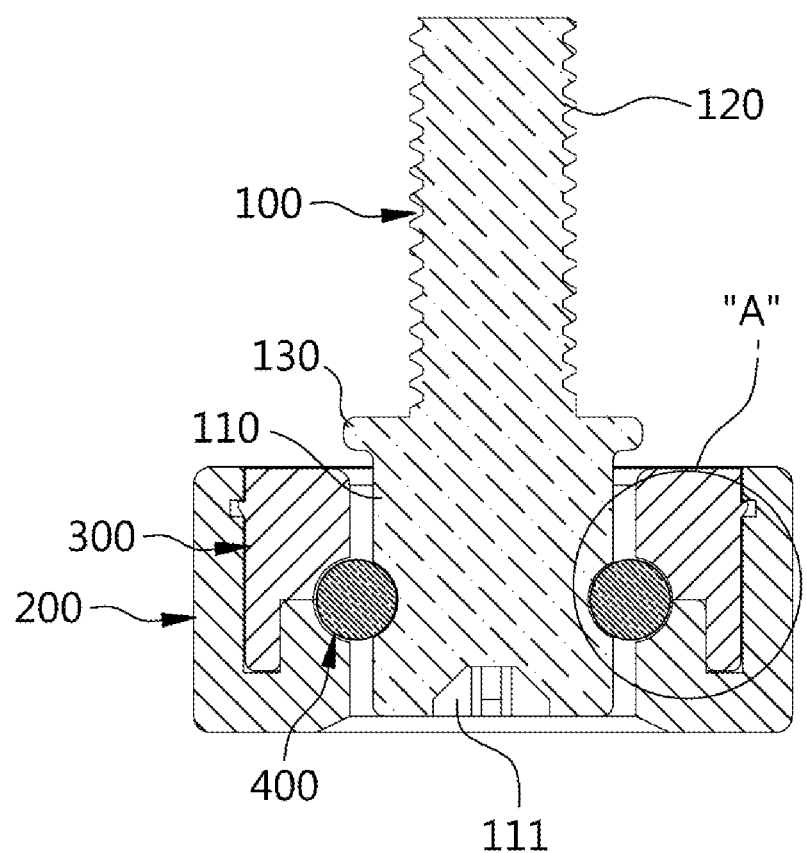
FIG. 5 is an assembled sectional view showing the roller assembly for a storage device according to the one embodiment of the present invention.
Figure 6:
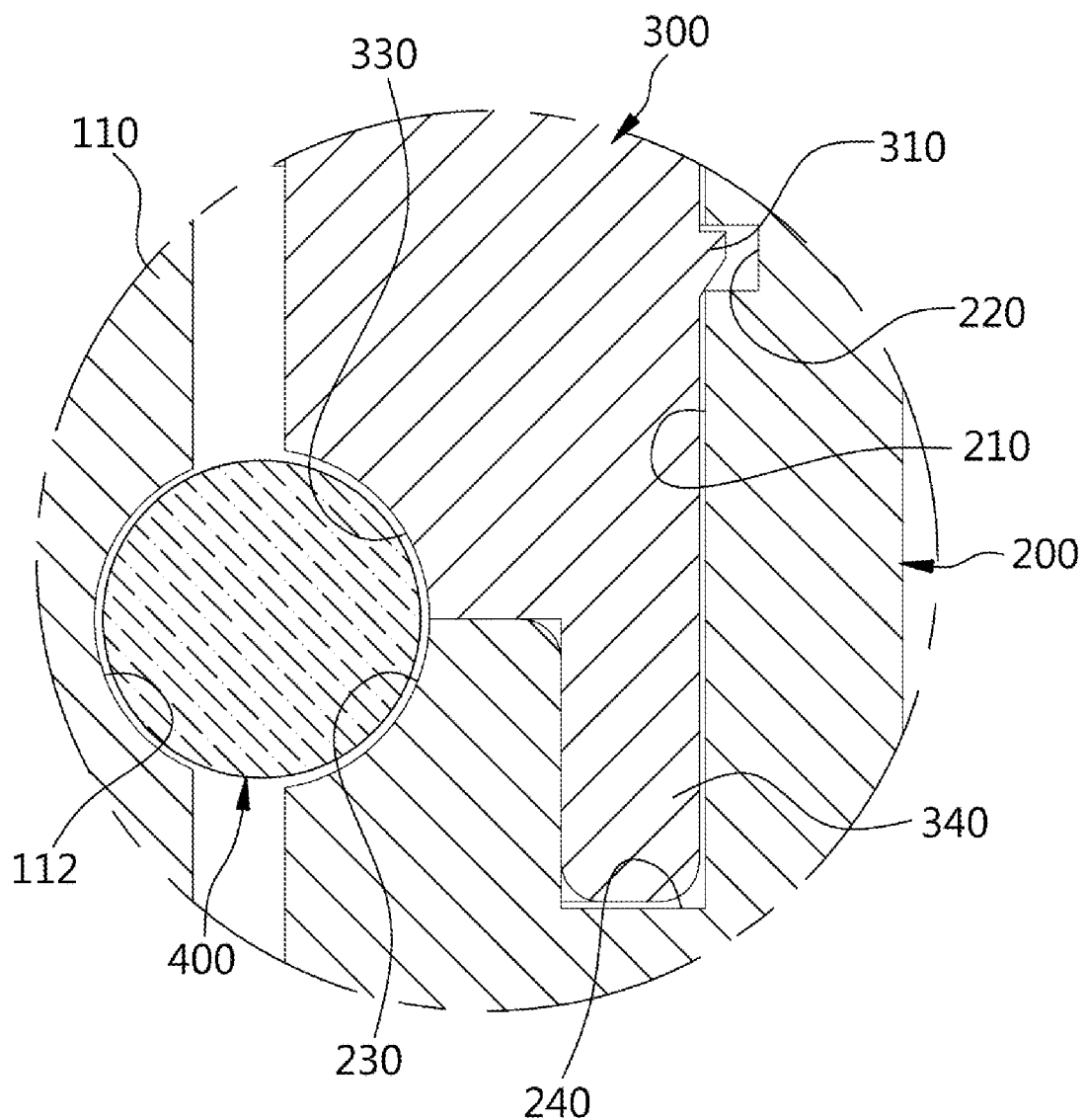
FIG. 6 is an enlarged view of portion "A" of FIG. 5.

The accompanying FIGS. 1 and 2 are exploded perspective views showing states viewed from different directions in order to illustrate a roller assembly for a storage device according to one embodiment of the present invention, FIGS. 3 and 4 are assembled perspective views showing states viewed from different directions in order to illustrate the roller assembly for a storage device according to the one embodiment of the present invention, and FIG. 5 is an assembled sectional view illustrating the roller assembly for a storage device according to the one embodiment of the present invention.

In accordance with this, the roller assembly for a storage device (hereinafter referred to as the "roller assembly") according to the one embodiment of the present invention basically includes a shaft member 100, a rolling member 200, a cover member 300, and ball members 400. In particular, the roller assembly is characterized in that the ball members 400 perform a rolling operation while being maintained in the state of being seated at specific locations by a seating groove 112 formed in the shaft member 100 and guide grooves 230 and 330 formed in the rolling member 200 and the cover member 300 and in that the rolling member 200 and the cover member 300 are coupled to each other by a fitting method and are then completely coupled to each other through laser bonding, and is additionally characterized in that the damage of the ball members 400 is prevented from occurring during the above laser bonding.

The individual components of the roller assembly will be described in greater detail, as follows.

First, the shaft member 100 is a component that is coupled to a storage device and that supports the rolling operation of the rolling member 200 and the cover member 300, which will be described later.

The shaft member 100 includes a head portion 110 and a coupling portion 120.

In this case, the head portion 110 is a part forming a head portion, and is formed to be accommodated within the rolling member 200 and the cover member 300. A tool groove 111, which meshes with a work tool (e.g., a driver, a hexagonal wrench, or the like), is depressed into the front surface of the head portion 110.

Furthermore, the coupling portion 120 is a portion that is coupled to a counterpart object (a storage device). In this case, threads are formed on the outer circumferential surface of the coupling portion 120, and thus the coupling portion 120 is configured to be coupled to the counterpart object in a screw manner.

Additionally, a coupling limiting barrier 130 is formed between the head portion 110 and the coupling portion 120. The coupling limiting barrier 130 is a structure that is provided to prevent a phenomenon in which the rolling member 200 or cover member 300 is brought into contact with the storage device due to the excessive coupling of the coupling portion 120 and subjected to interference in its rolling during a process in which the corresponding roller assembly is coupled to the storage device.

Next, the rolling member 200 is a portion that forms the appearance of the roller assembly and rolls.

The rolling member 200 is formed in a cylindrical shape having an open inside. In other words, the outer circumferential surface of the rolling member 200 is provided as a rolling portion that rolls along a rail, and the inner circumferential surface of the rolling member 200 is provided as a portion that surrounds a part of the front side of the head portion 110 constituting a part of the shaft member 100.

In particular, a coupling groove 210 is depressed into the rear side portion of the inner circumferential surface of the rolling member 200 in a stepped form. The cover member 300 is accommodated in a space formed inside the coupling groove 210 due to the stepped structure of the rolling member 200.

Furthermore, a stop step 220 is depressed into the inner circumferential surface of a rear side inside the coupling groove 210 formed on the rolling member 200. The stop step 220 is a portion that is used for coupling with the cover member 300, which will be described later.

Next, the cover member 300 is a portion that forms a roller along with the rolling member 200. The cover member 300 is accommodated in and coupled with the coupling groove 210 of the rolling member 200, and is configured such that the inner circumferential surface is formed to surround a part of the rear side of the head portion 110 that constitutes a part of the shaft member 100.

In other words, a roller that rolls under the support of the head portion 110 constituting a part of the shaft member 100 is formed by the coupling of the cover member 300 and the rolling member 200.

In particular, a stop protrusion 310 protrudes from the outer circumferential surface of the rear side of the cover member 300. Accordingly, when the cover member 300 is inserted into the coupling groove 210 of the rolling member 200, the stop protrusion 310 is caught in and confined by the stop step 220 on the inner circumferential surface of the coupling groove 210.

Meanwhile, the rolling member 200 and the cover member 300 are formed through injection molding, thereby enabling mass production. In this case, the stop step 220 is depressed within a non-excessively deep range and formed at a location near a corresponding end of the corresponding rolling member 200, thereby enabling smooth separation after injection molding and also facilitating the coupling of the cover member 300.

Next, the ball members 400 are components that enable the rolling member 200 to roll more desirably on the shaft member 100.

The ball members 400 perform a rolling operation with the circumferential surfaces thereof partially seated in the portions where the outer circumferential surface of the head portion 110 constituting the shaft member 100 and the inner circumferential surfaces of the rolling member 200 and the cover member 300 meet one another.

In this case, the seating groove 112 onto which the circumferential surfaces of the ball members 400 are partially seated is depressed into the outer circumferential surface of the head portion 110, and the guide grooves 230 and 330 are depressed into portions of the inner circumferential surfaces of the rolling member 200 and the cover member 300 that meet each other and are opposite to the seating groove 112 of the shaft member 100. This is as shown in the accompanying FIG. 6.

Meanwhile, an embodiment of the present invention additionally proposes a configuration in which the rolling member 200 and the cover member 300 may be integrated with each other through laser bonding.

In other words, in light of the fact that there is concern that the coupling between the rolling member 200 and the cover member 300 may be released due to a structure including the stop step 220 and the stop protrusion 310 when an excessive load is provided to the roller assembly, the coupling between the rolling member 200 and the cover member 300 is prevented from being released by the laser bonding. It will be apparent that the rolling member 200 and the cover member 300 may be integrated with each other by using ultrasonic bonding. However, in this case, there is concern that the internally located ball members 400 may be damaged, and thus it is preferable that the cover member 300 and the rolling member 200 are integrated with each other through laser bonding, as described above. In this case, laser-bonded portions may be the inner circumferential surface of the coupling groove 210 of the rolling member 200 and the outer circumferential surface of the cover member 300.

For this purpose, in an embodiment of the present invention, the rolling member 200 is formed in a color (e.g., white) that transmits a laser beam, and the cover member 300 is formed in a color (e.g., black) that does not transmit a laser beam.

In particular, a press-fitting groove 240 is depressed into the front of the circumferential side of the coupling groove 210 formed in the rolling member 200, and a press-fitting protrusion 340 configured to be accommodated in the press-fitting groove 240 of the rolling member 200 protrudes from the front of the circumferential side of the cover member 300. In this case, the press-fitting protrusion 340 of the cover member 300 is additionally characterized by protruding up to a length sufficient to cover the portions where the ball members 400 are located.

In other words, the additional provision of the press-fitting protrusion 340 may prevent the damage of the ball members 400 that may be caused as a laser beam is transmitted up to the ball members 400.

It will be apparent that the press-fitting protrusion 340 and the press-fitting groove 240 additionally function to disperse pressing force, applied to the rolling member 200, to the portion where the press-fitting protrusion 340 of the cover member 300 is located, thereby preventing the problem in which the defective rolling of the ball members 400 is caused because the pressing force is concentrated only on specific locations of the ball members 400.

In the following, the process of assembling the above-described roller assembly for a storage device according to the one embodiment of the present invention will be described in greater detail.

Figure 7:
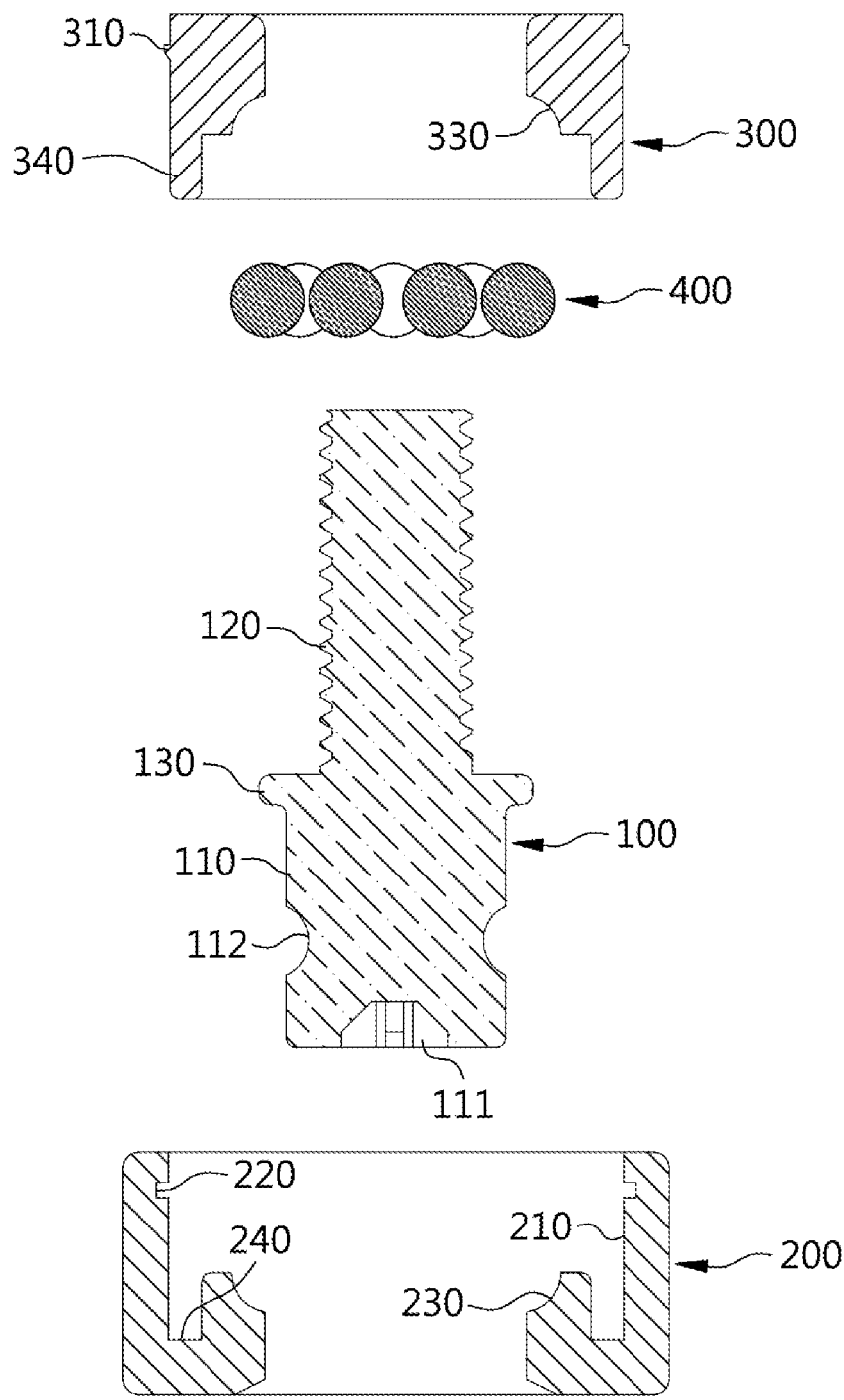
FIGS. 7 to 10 are sectional views of respective assembled states illustrating a process of assembling the roller assembly for a storage device according to the one embodiment of the present invention.

First, as shown in the accompanying FIG. 7, a shaft member 100, a rolling member 200, a cover member 300, and ball members 400 that have been separately fabricated are separately prepared.

Figure 8:
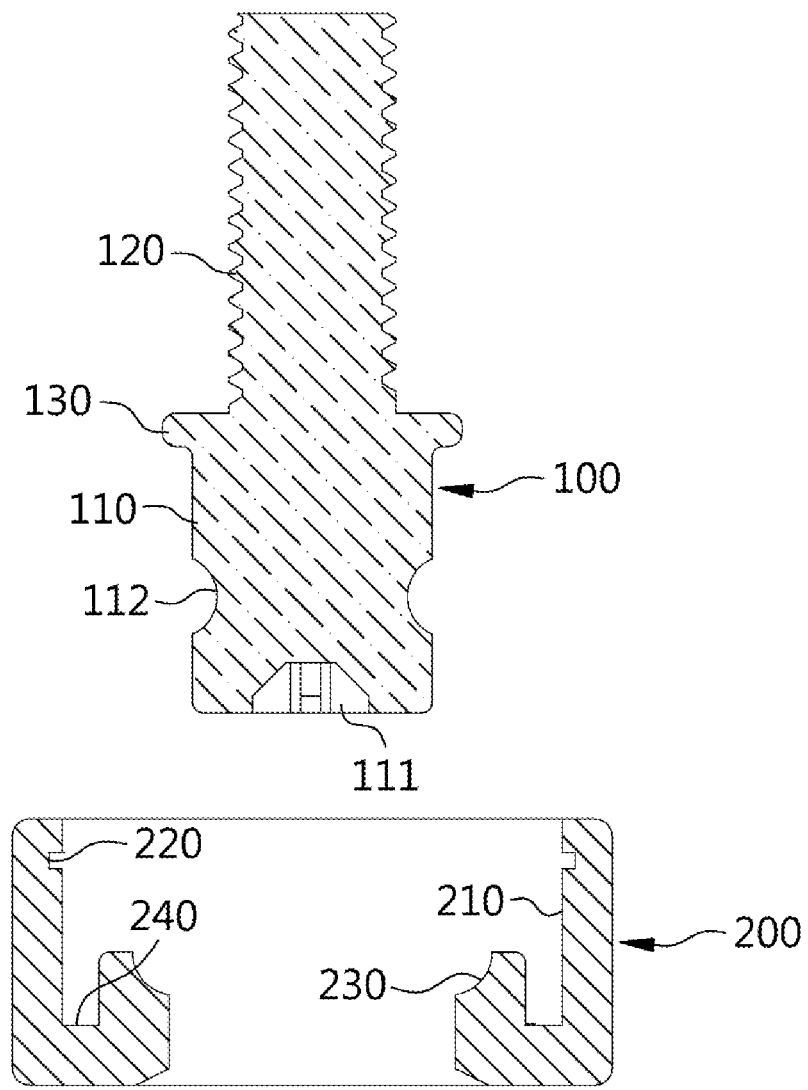

Furthermore, the head portion 110 of the shaft member 100 is inserted into the rolling member 200 in a state in which the rolling member 200 prepared as described above has been placed on the top surface of a workbench or the like, which is as shown in the accompanying FIG. 8.

Figure 9:
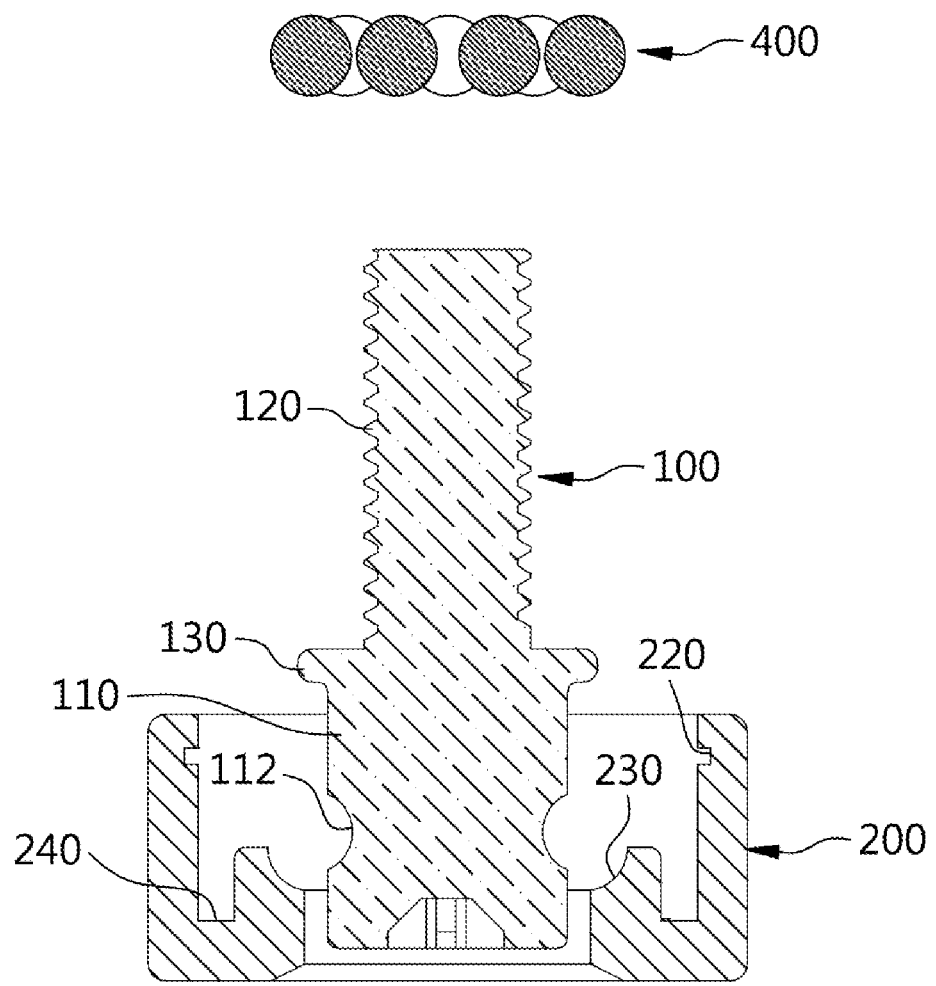

In this case, the seating groove 112 of the head portion 110 is not completely aligned with but is partially aligned with the guide groove 230 of the rolling member 200, in which state the ball members 400 are inserted into the seating groove 112 and the guide groove 230, as shown in accompanying FIG. 9.

Figure 10:
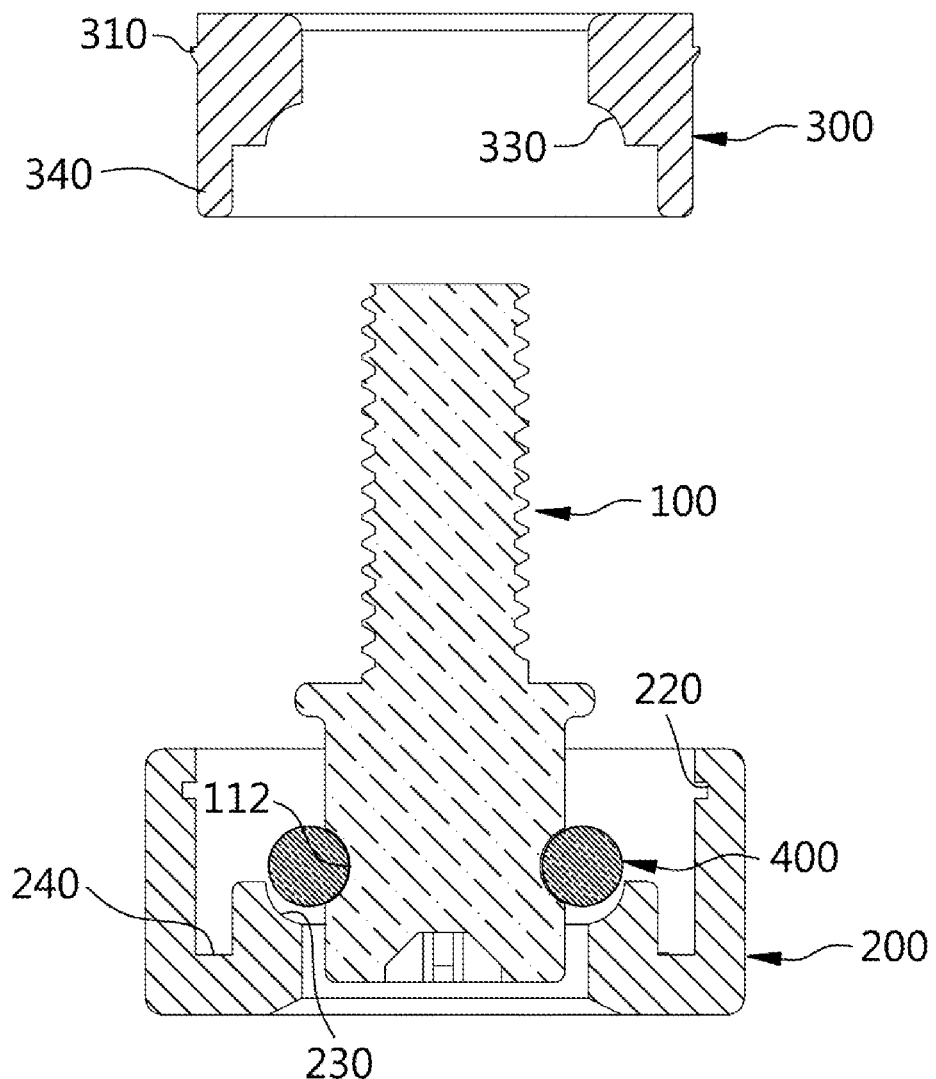

Thereafter, as shown in the accompanying FIG. 10, the cover member 300 is coupled to the rolling member 200. In this case, the cover member 300 and the rolling member 200 may be accurately coupled to each other by inserting the press-fitting protrusion 340 protruding from the cover member 300 into the press-fitting groove 240 formed in the rolling member 200. Furthermore, when the cover member 300 is completely inserted into the rolling member 200, the stop protrusion 310 formed on the outer circumferential surface of the cover member 300 is caught in the stop step 220 formed on the inner circumferential surface of the rolling member 200, thereby completing the coupling thereof, as shown in the accompanying FIG. 5.

Furthermore, the rolling member 200 and the cover member 300 are bonded together by means of a laser beam by radiating the laser beam from the circumferential surface of the rolling member 200 in a radial direction in a state in which the assembly has been completed. Laser-bonded portions are the opposite portions of the inner circumferential surface of the rolling member 200 and the outer circumferential surface of the cover member 300.

In this case, the rolling member 200 is formed in the color that transmits a laser beam, and thus the laser beam is desirably transmitted therethrough. In contrast, the cover member 300 is formed in a color that does not transmit a laser beam, and thus only the contact surfaces of the rolling member 200 and the cover member 300 are laser-bonded, with the result that the damage of the ball members 400 attributable to the excessive transmission of a laser beam does not occur.

As a result, the ball members 400 may perform a rolling operation while maintaining corresponding locations in the state of being accommodated in the seating groove 112 formed in the head portion 110 of the shaft member 100 and the guide grooves 230 and 330 formed in the inner circumferential surfaces of the rolling member 200 and the cover member 300, respectively.

Furthermore, the roller assembly for a storage device, which is assembled as described above, is used with the coupling portion 120, constituting a part of the shaft member 100, coupled to a coupling counterpart object, such as a storage device.

Meanwhile, the roller assembly for a storage device according to the present invention is not limited only to the structure of the above-described embodiment.

For example, although the cover member 300 is prevented from being separated backward from the rolling member 200 by means of a structure including the stop step 220 and the stop protrusion 310, there is still concern that the cover member 300 is separated backward from the rolling member 200 due to movement, such as the vibration of the rolling member 200, when the ball members 400 are not maintained at accurate locations while the rolling member 200 is rolling.

Therefore, another embodiment of the present invention additionally proposes a configuration in which a blocking protrusion 250 is formed on the rear surface of the rolling member 200 in the structure of the above-described roller assembly for a storage device according to the one embodiment, thereby preventing the cover member 300 from being separated backward.

Figure 11:
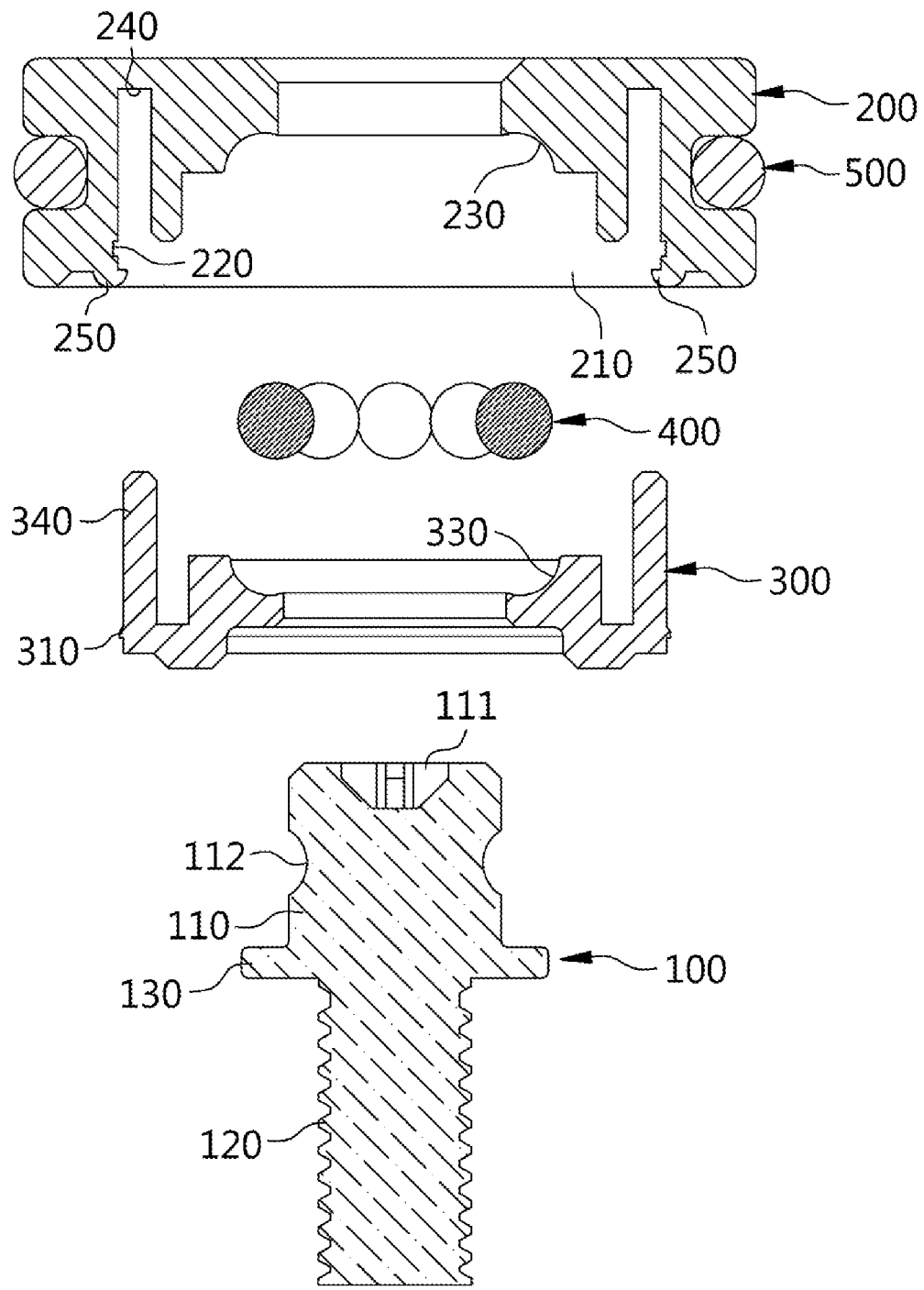
FIG. 11 is an exploded sectional view illustrating a roller assembly for a storage device according to another embodiment of the present invention.
Figure 12:
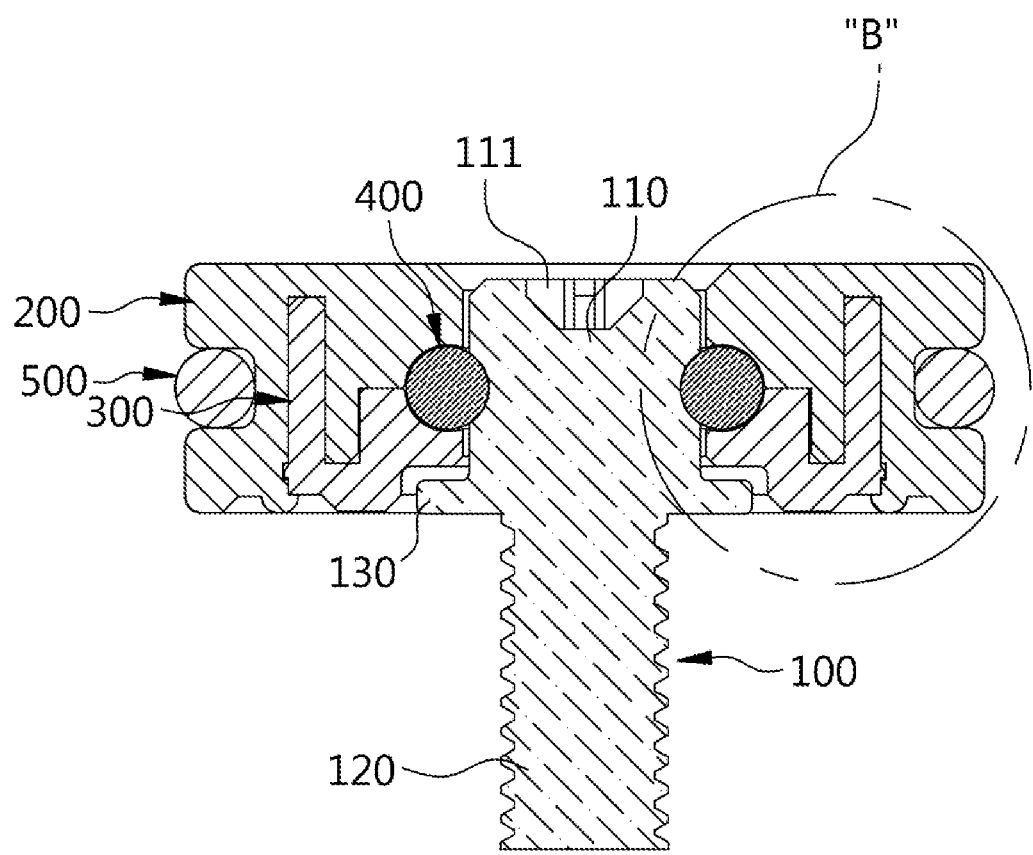
FIG. 12 is an assembled sectional view illustrating the roller assembly for a storage device according to the other embodiment of the present invention.
Figure 13:
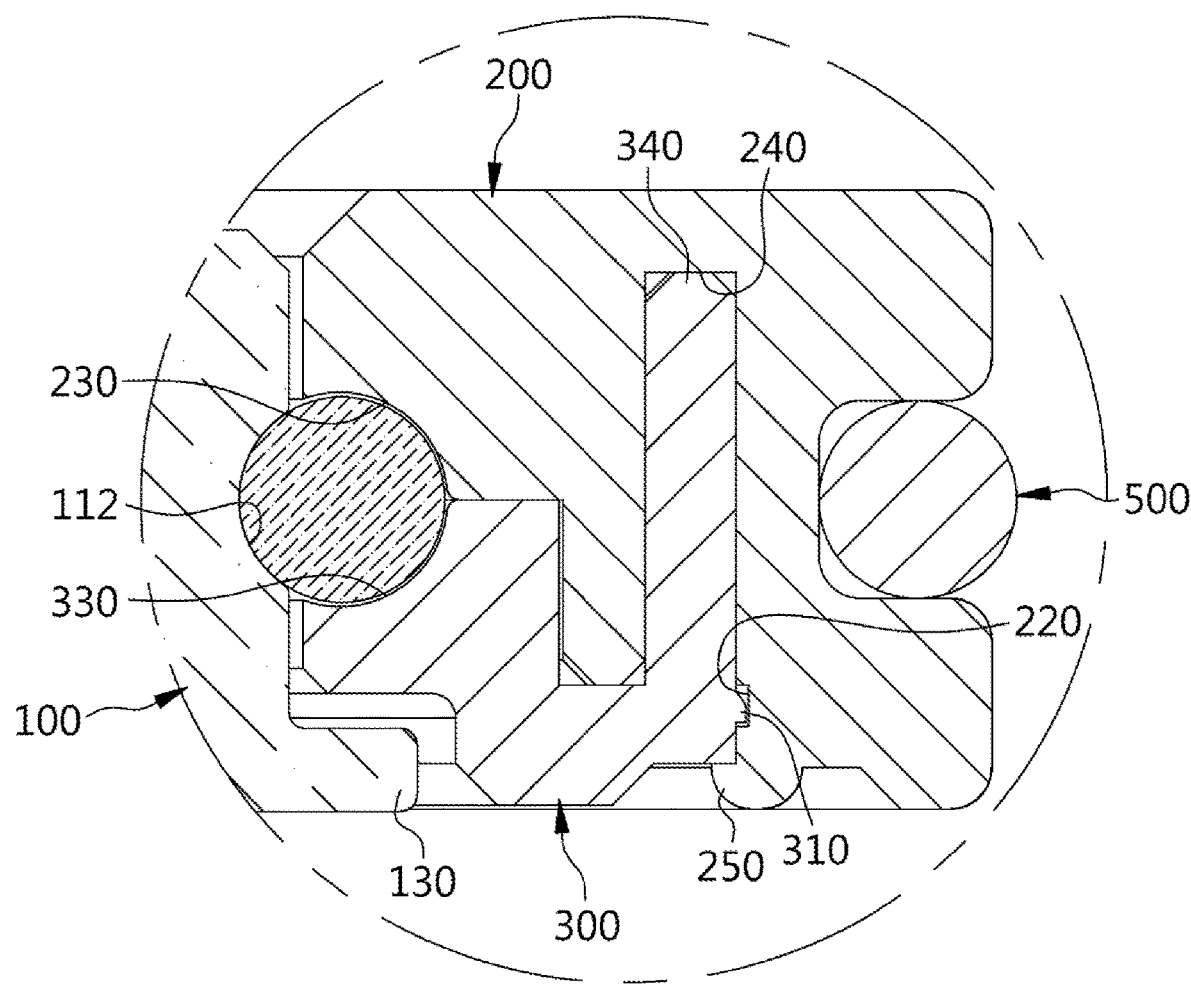
FIG. 13 is an enlarged view of portion "B" of FIG. 12.

In other words, as shown in the accompanying FIGS. 11 to 13, the blocking protrusion 250 configured to block the circumferential side portion of the mar surface of the cover member 300 seated in the coupling groove 210 of the corresponding rolling member 200 is additionally formed on the rear surface of the rolling member 200, thereby preventing the cover member 300 from being separated backward from the coupling groove 210.

In this case, the blocking protrusion 250 may be formed through fusing or thermal bonding after the cover member 300 has been press-fitted into the rolling member 200.

Reference symbol 500 designates a rubber ring-shaped contact member disposed on the outer circumferential surface of the rolling member 200.

Meanwhile, the above-described roller assembly for a storage device according to the one embodiment may be configured such that the seating groove 112 and the guide grooves 230 and 330 are formed to have the same curvature as the ball members 400, thereby enabling the vibration of the shaft member 100 to be minimized.

In other words, in the case of the ball members 400 formed in spherical shapes, the shaking of contact portions (of the rolling member) may be evenly dispersed in spite of the occurrence of the shaking only when the contact portions come into tangential contact. In contrast, when portions that come into contact with the ball members 400 are formed to have straight lines or non-uniform curvatures, the gaps between the portions that come into contact with the ball members 400 and the portions that do not come into contact with the ball members 400 are large, and thus additional movement will have to occur.

Moreover, it is preferable that the seating groove 112 formed in the shaft member 100 is formed to have a depth less than ½ of the diameter of the ball members 400 and the guide grooves 230 and 330 formed at the rear side end of the inner circumferential surface of the rolling member 200 and at the front side end of the inner circumferential surface of the cover member 300, respectively, are formed to cooperatively have a depth sufficient to accommodate ½ or more of the diameter of the ball members 400. In particular, the guide groove 230 of the rolling member 200 and the guide groove 330 of the cover member 300 are formed to have the same size, thereby preventing the movement of the ball members 400 accommodated in the guide grooves 230 and 330 from occurring in a direction to any one side (a rolling member side or a cover member side) during the rolling operation of the corresponding rolling members 200.

The above-described structure allows a wall surface facing the circumferential surface of the head portion 110 of the shaft member 100, i.e., the inner circumferential surfaces of the rolling member 200 and the cover member 300, to be as close as possible to the circumferential surface of the head portion 110, thereby minimizing noncontact portions that do not support the ball members 400. Through this, the maximum portions of the ball members 400 may be supported and guided, so that the tilting of the shaft member 100 attributable to the presence of the non-contact portions during the rolling operation of the rolling member 200 is minimized and also the level of the movement of the shaft member 100 is minimized. Accordingly, the stable rolling operation of the rolling member 200 may be performed, and also the ball members 400 may be fundamentally prevented from being separated.

When there is applied a structure in which the blocking protrusion 250 is additionally formed and the guide grooves 230 and 330 are each formed to a depth sufficient to accommodate at least ½ of each of the ball members 400 as in the above-described other embodiment, the roller assembly is assembled in a manner different from that of the above-described one embodiment.

Figure 14:
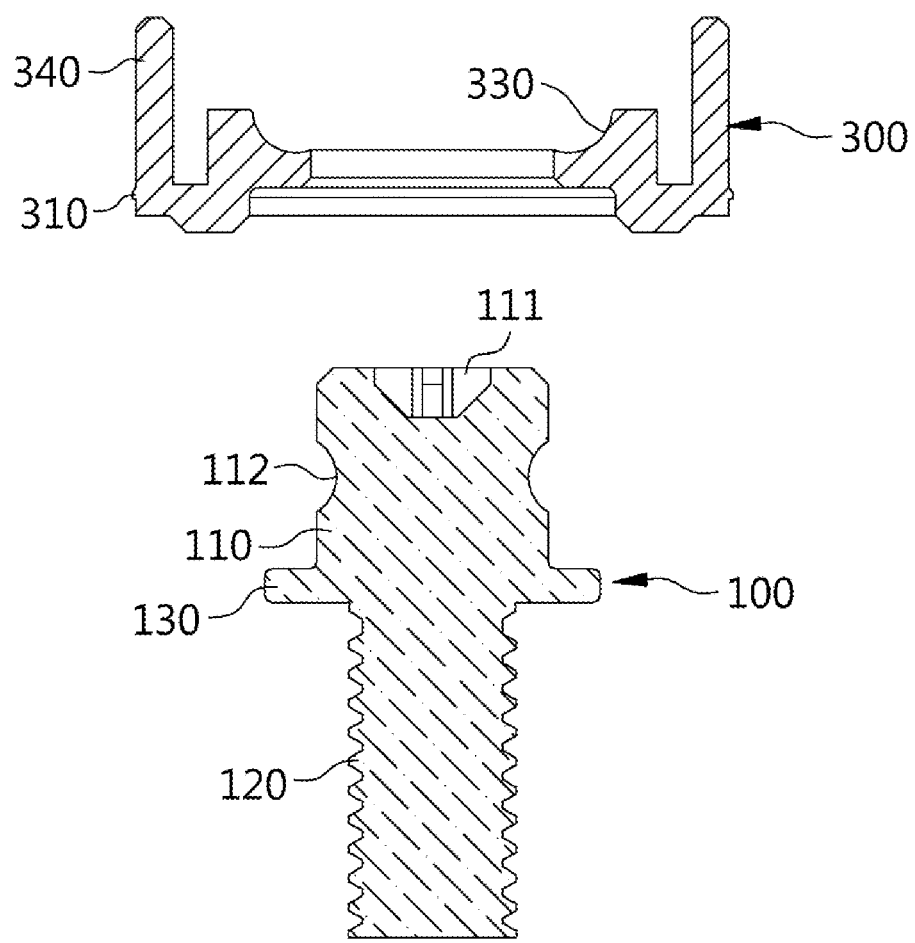
FIGS. 14 to 17 are sectional views of respective assembled states illustrating a process of assembling the roller assembly for a storage device according to the other embodiment of the present invention.
Figure 15:
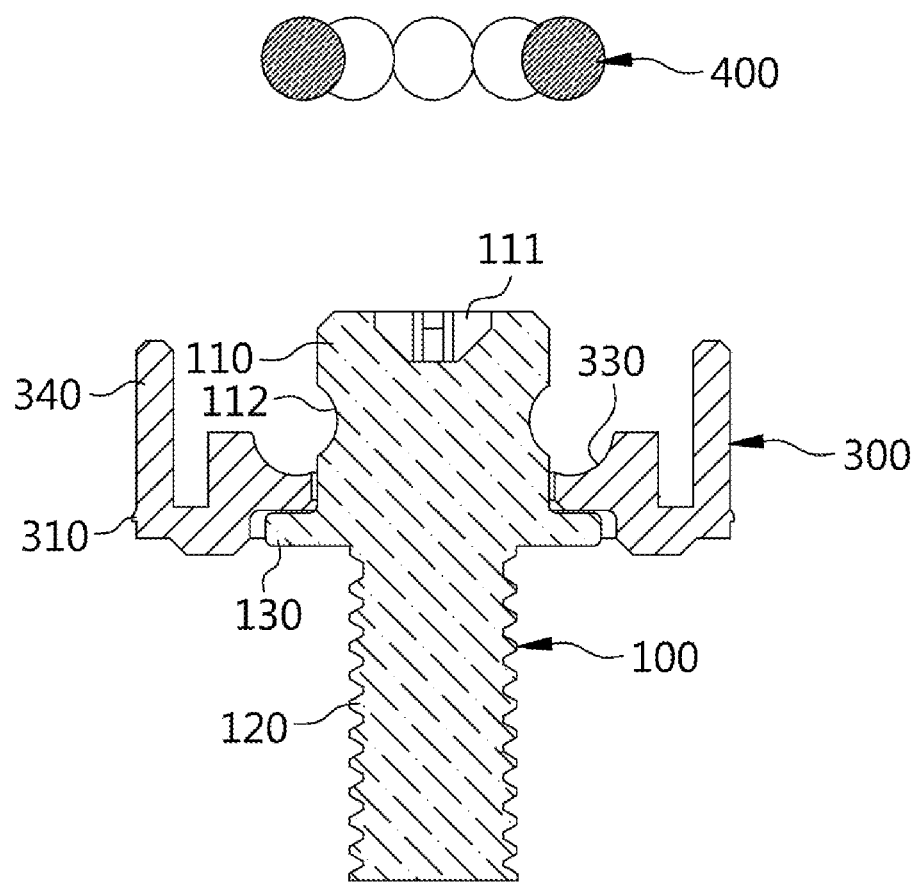
Figure 16:
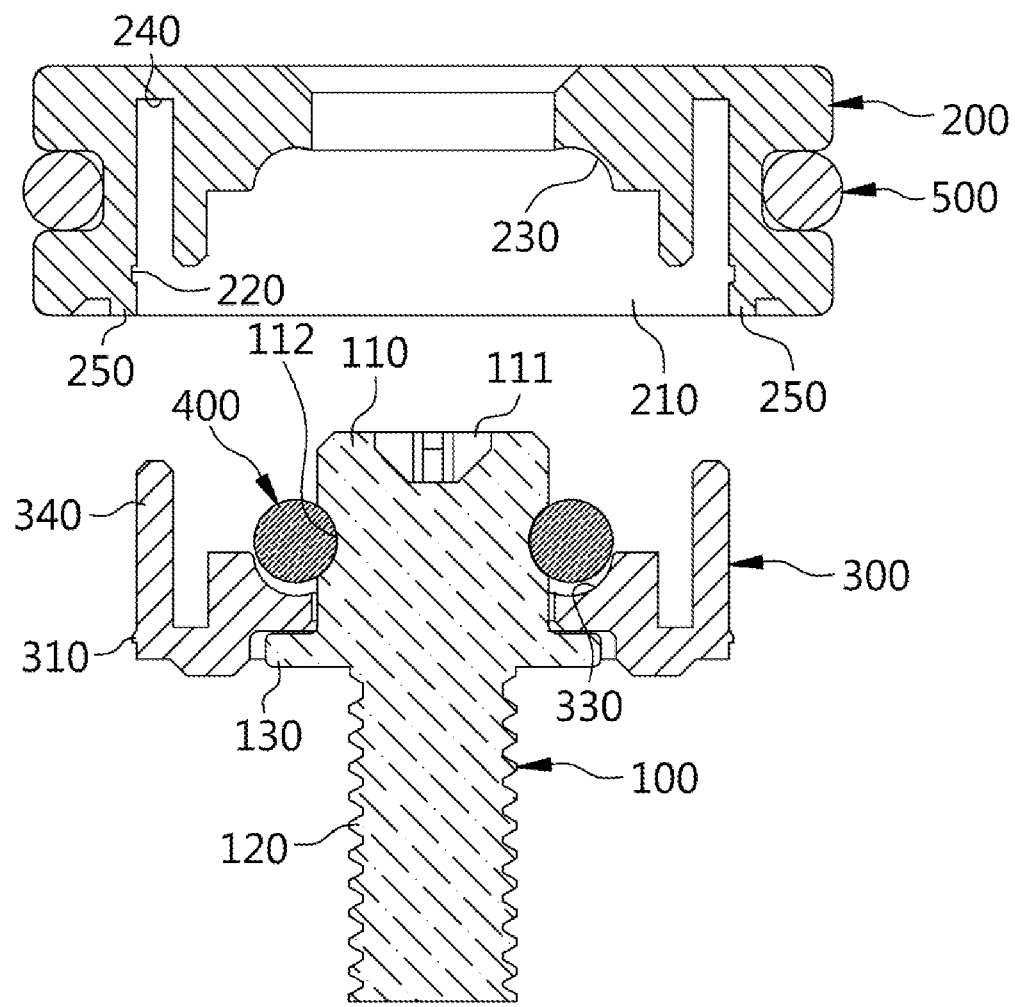
Figure 17:
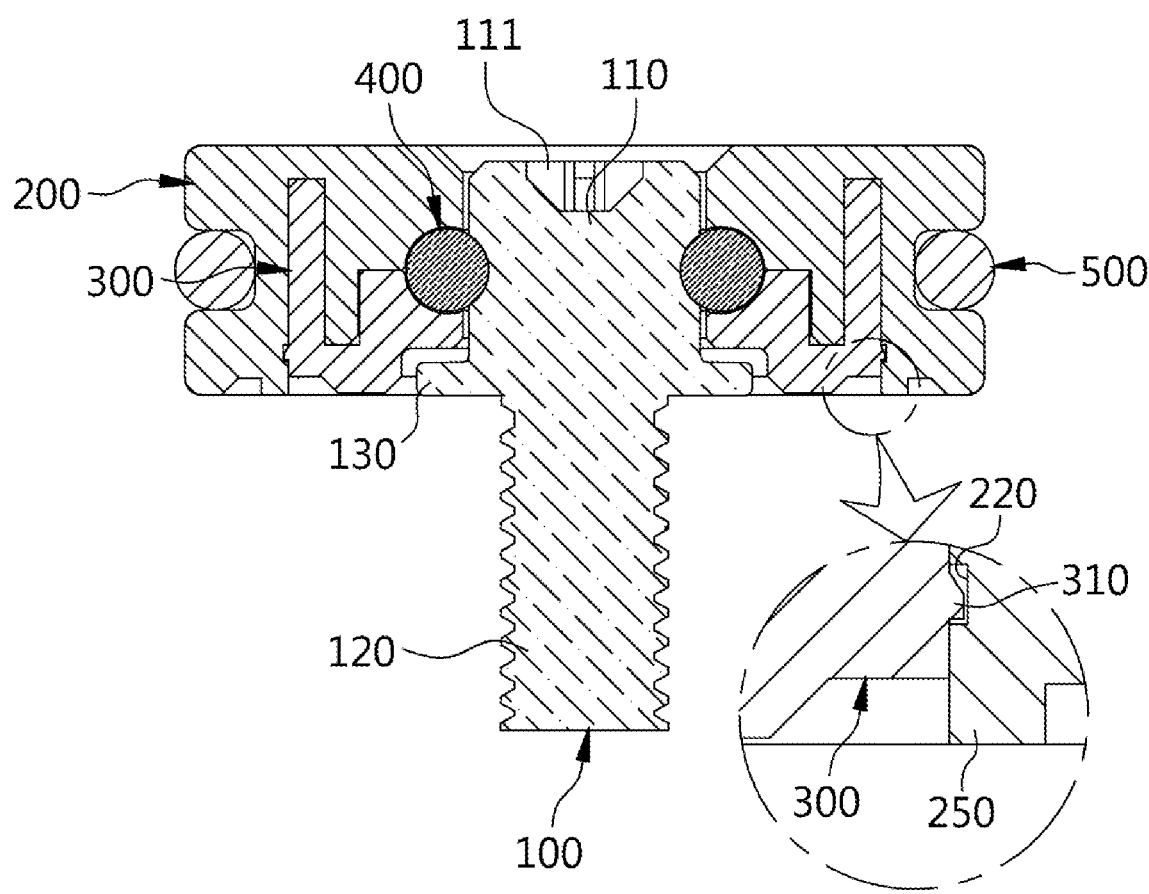

In other words, the shaft member 100 and the cover member 300 are coupled to each other first, as shown in the accompanying FIG. 14, the ball members 400 are seated in the seating groove 112 of the shaft member 100 and the guide groove 330 of the cover member 300, as shown in the accompanying FIG. 15, the rolling member 200 is coupled, as shown in the accompanying FIG. 16, and then the blocking protrusion protrusion 250 is formed through thermal bonding, as shown in the accompanying FIG. 17, thereby completing coupling work.

It will be apparent that the above-described roller assembly according to the one embodiment of the present invention may be assembled in the sequence proposed in the other embodiment.

As a result, in the roller assembly for a storage device according to the present invention, when an operation is performed to take out or put in the storage device, the smooth rolling of the rolling member 200 may be performed through the rolling operation of the individual ball members 400.

In particular, in the roller assembly for a storage device according to the present invention, the assembly thereof is performed by the work of sequentially seating the individual components 100, 200, 300 and 400, rather than by the work of forcibly press-fitting a bearing, thereby facilitating assembly work.

Additionally, in the roller assembly for a storage device according to the present invention, the cover member 300 and the rolling member 200 are coupled to each other by using the stop step 220 and the stop protrusion 320, rather than by performing simple coupling through insertion, thereby performing coupling at an accurate location. Furthermore, in the coupled state, the cover member 300 and the rolling member 200 are integrated with each other by laser bonding, thereby preventing them from being separated from each other during use.

In particular, in the roller assembly for a storage device according to the present invention, the pressing force provided to the corresponding rolling member 200 during the rolling operation of the rolling member 200 may be desirably dispersed to the cover member 300 through the additional provision of a structure including the press-fitting protrusion 340 of the cover member 300 and the press-fitting groove 240 of the rolling member 200, thereby minimizing the occurrence of damage and also preventing the ball members 400 from being damaged by a laser beam during laser bonding.

The invention claimed is:

1. A roller assembly for a storage device, the roller assembly comprising:
    a shaft member including a head portion configured such that the head portion forms a head part and a seating groove is depressed from a circumferential surface thereof and a coupling portion configured to extend backward from the head portion and to be engaged with a counterpart object;
    a rolling member configured to be formed in a cylindrical shape forming a rolling part, and configured such that a front side portion of an inner circumferential surface thereof is formed to surround a part of a front side of the head portion and a coupling groove is depressed into a rear side portion of the inner circumferential surface in a stepped form;
    a cover member configured to be seated onto the coupling groove of the rolling member, and configured such that an inner circumferential surface thereof is formed to surround a part of a rear side of the head portion; and
    ball members configured such that circumferential surfaces thereof are partially seated on opposite surfaces of the shaft member and the rolling and cover members and the ball members perform a rolling operation,
    wherein guide grooves having a same curvature as the ball members are formed at a rear side end of the inner circumferential surface of the rolling member and a front side end of the inner circumferential surface of the cover member, respectively.

2. The roller assembly of claim 1, wherein a coupling limiting barrier is extended from and formed between the head portion and coupling portion of the shaft member.

3. The roller assembly of claim 1, wherein the rolling member is formed in a color that transmits a laser beam, the cover member is formed in a color that does not transmit a laser beam, and opposite surfaces of the rolling member and the cover member are fastened to each other by laser bonding.

4. The roller assembly of claim 3, wherein:
    a press-fitting groove is depressed into a front circumferential side of the rolling member inside the coupling groove formed in the rolling member, and a press-fitting protrusion configured to be accommodated inside the press-fitting groove protrudes from a front of a circumferential side of the cover member; and
    the press-fitting protrusion of the cover member protrudes up to a length sufficient to cover portions where the ball members are located.

5. The roller assembly of claim 1, wherein:
    a stop step is depressed from the rear side portion of the inner circumferential surface of the rolling member; and
    a stop protrusion configured to be caught in the stop step protrudes from an outer circumferential surface of a rear side of the cover member.

6. The roller assembly of claim 1, wherein a blocking protrusion configured to prevent the cover member from being separated backward by blocking a circumferential side portion of a rear surface of the cover member seated onto the coupling groove is formed on a rear surface of the rolling member.

7. The roller assembly of claim 1, wherein the guide grooves formed at the rear side end of the inner circumferential surface of the rolling member and the front side end of the inner circumferential surface of the cover member, respectively, are formed to cooperatively have a depth sufficient to accommodate half or more of a diameter of each of the ball members.

* * * * *